US008768975B2

(12) United States Patent
Boyd et al.

(10) Patent No.: US 8,768,975 B2
(45) Date of Patent: \*Jul. 1, 2014

(54) PRESENTING INTELLIGENT TAGGING SUGGESTIONS FOR A PHOTOGRAPH

(75) Inventors: Christopher T. Boyd, Holly Springs, NC (US); Candice L. Coletrane, Durham, NC (US); Adam J. Parker, Cary, NC (US)

(73) Assignee: International Business Machines Corporation, Armonk, NY (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/218,038

(22) Filed: Aug. 25, 2011

(65) Prior Publication Data

US 2013/0054614 A1     Feb. 28, 2013

(51) Int. Cl.
*G06F 17/30*     (2006.01)
(52) U.S. Cl.
CPC ................................. *G06F 17/30047* (2013.01)
USPC .......................................................... 707/804
(58) Field of Classification Search
USPC .......................................................... 707/804
See application file for complete search history.

(56) References Cited

U.S. PATENT DOCUMENTS

| 7,644,096 | B2 | 1/2010 | Sjölander | |
|---|---|---|---|---|
| 2007/0233736 | A1\* | 10/2007 | Xiong et al. | 707/104.1 |
| 2008/0069449 | A1 | 3/2008 | Cho et al. | |
| 2008/0195657 | A1\* | 8/2008 | Naaman et al. | 707/104.1 |
| 2009/0256678 | A1 | 10/2009 | Ryu | |
| 2011/0044512 | A1 | 2/2011 | Bambha et al. | |
| 2011/0087674 | A1 | 4/2011 | Schokking et al. | |
| 2011/0142299 | A1 | 6/2011 | Akbarzadeh et al. | |

OTHER PUBLICATIONS

Anonymous, "Using Person Profile Database and Algorithm to Use Context to Enhance Face Recognition in Photos", IP.com Prior Art Database, Feb. 18, 2011, pp. 1-4, IP.com, USA.

\* cited by examiner

*Primary Examiner* — Robert Beausoliel, Jr.
*Assistant Examiner* — Nirav K Khakhar
(74) *Attorney, Agent, or Firm* — Brandon C. Kennedy; Katherine S. Brown; Biggers Kennedy Lenart Spraggins LLP (57) ABSTRACT

Methods, apparatuses, and computer program products for presenting intelligent tagging suggestions for a photograph are provided. Embodiments include identifying, by a tagging module, contextual information indicating circumstances in which the photograph was taken; based on the contextual information, selecting, by the tagging module, candidate profiles from a plurality of friend profiles associated with a profile of a user; and suggesting, by the tagging module to the user, the selected candidate profiles as potential friends to tag in the photograph.

12 Claims, 8 Drawing Sheets

PRESENTING INTELLIGENT TAGGING SUGGESTIONS FOR A PHOTOGRAPH

BACKGROUND OF THE INVENTION

1. Field of the Invention

The field of the invention is data processing, or, more specifically, methods, apparatuses, and computer program products for presenting intelligent tagging suggestions for a photograph.

2. Description of Related Art

Social networking websites now store and display more photographs then any other website type. One advantage of displaying photographs on social networking sites is the ability to tag people in these photographs. A tag is a link between that photograph and the personal profile of the person in the picture. The photograph can possibility be accessed through that person's profile and that person's profile may be accessed through the photograph. Typically, the process for tagging for person in a photograph involves a user manually typing in a name of one of the user's friends or the user scrolling through a list of all of the user's friends. In cases where the user has many friends, this manual process may be time consuming.

SUMMARY OF THE INVENTION

Methods, apparatuses, and computer program products for presenting intelligent tagging suggestions for a photograph are provided. Embodiments include identifying, by a tagging module, contextual information indicating circumstances in which the photograph was taken; based on the contextual information, selecting, by the tagging module, candidate profiles from a plurality of friend profiles associated with a profile of a user; and suggesting, by the tagging module to the user, the selected candidate profiles as potential friends to tag in the photograph.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
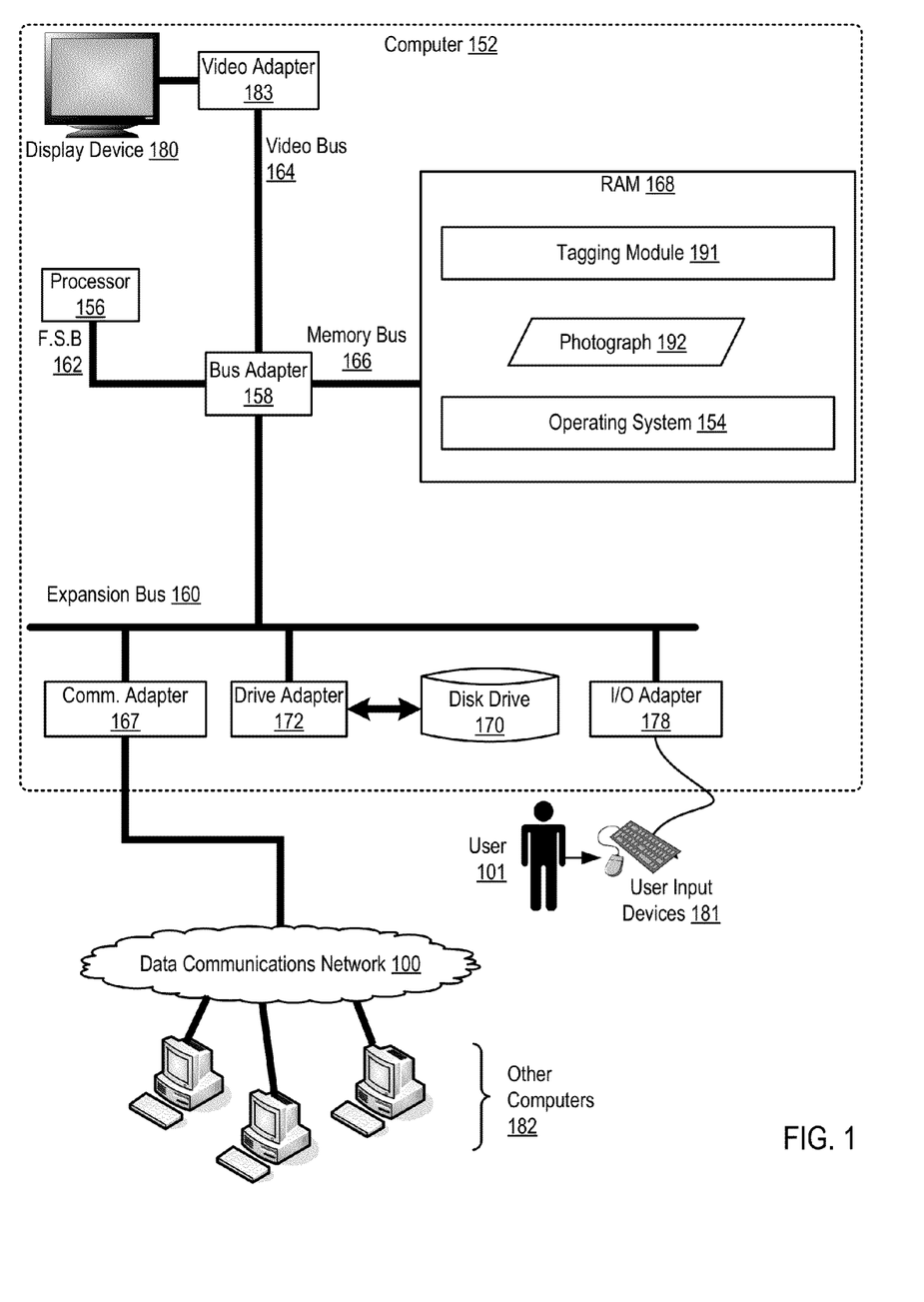
FIG. 1 sets forth a block diagram of automated computing machinery comprising an exemplary computer useful in presenting intelligent tagging suggestions for a photograph according to embodiments of the present invention.

Exemplary methods, apparatus, and products for presenting intelligent tagging suggestions for a photograph in accordance with the present invention are described with reference to the accompanying drawings, beginning with FIG. 1. Presenting intelligent tagging suggestions for a photograph in accordance with the present invention is generally implemented with computers, that is, with automated computing machinery. FIG. 1 sets forth a block diagram of automated computing machinery comprising an exemplary computer (152) useful in presenting intelligent tagging suggestions for a photograph according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a tagging module (191) that includes computer program instructions for presenting intelligent tagging suggestions for a photograph according to embodiments of the present invention. Specifically, the tagging module (191) includes computer program instructions that when executed by the processor (156) cause the computer (152) to carry out the steps of: identifying, by the tagging module (191), contextual information indicating circumstances in which the photograph (192) was taken; based on the contextual information, selecting, by the tagging module (191), candidate profiles from a plurality of friend profiles associated with a profile of a user; and suggesting, by the tagging module (191) to the user (101), the selected candidate profiles as potential friends to tag in the photograph (192).

Also stored in RAM (168) is an operating system (154). Operating systems useful presenting intelligent tagging suggestions for a photograph according to embodiments of the present invention include UNIX™, Linux™, Microsoft XP™, AIX™, IBM's i5/OS™, and others as will occur to those of skill in the art. The operating system (154) and the tagging module (191) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for presenting intelligent tagging suggestions for a photograph according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for presenting intelligent tagging suggestions for a photograph according to embodiments of the present invention include modems for wired dial-up communications, Ethernet (IEEE 802.3) adapters for wired data communications network communications, and 802.11 adapters for wireless data communications network communications.

Figure 2:
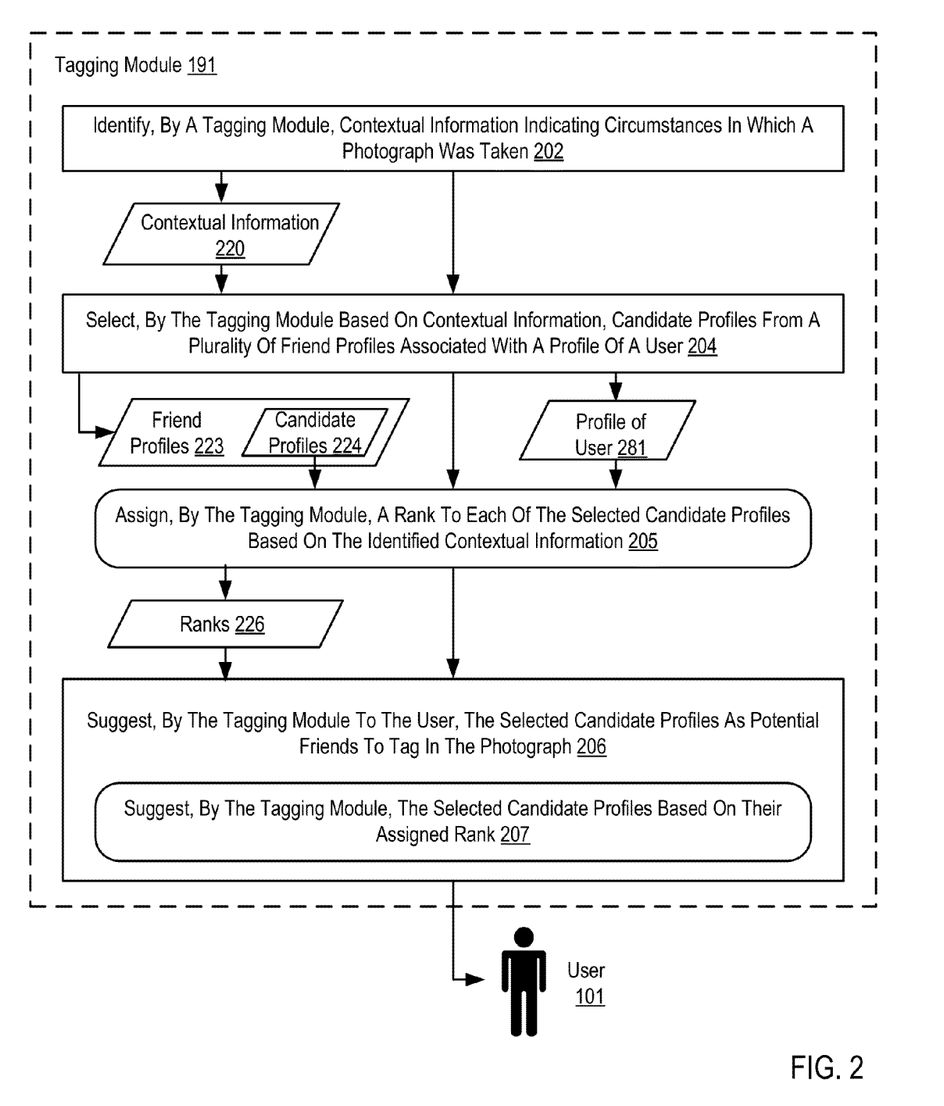
FIG. 2 sets forth a flow chart illustrating an exemplary method for presenting intelligent tagging suggestions for a photograph according to embodiments of the present invention.

For further explanation, FIG. 2 sets forth a flow chart illustrating an exemplary method for presenting intelligent tagging suggestions for a photograph according to embodiments of the present invention. The method of FIG. 2 includes identifying (202), by a tagging module (191), contextual information (220) indicating circumstances in which the photograph (191) was taken. Contextual information may include any information available from a social networking service. Examples of contextual information include profile information, photograph tags, events, messages, wall postings, interest group associations, and others as will occur to those of skill in the art. Identifying (202) contextual information (220) indicating circumstances in which the photograph (191) was taken may be carried out by receiving contextual information from a social networking website. For example, the contextual information for a particular photograph may indicate that the photograph is part of an album and that the album is a grouping of pictures that were all taken at a specific time, at a specific location, as part of a specific meeting or group of friends, or was part of a specific event.

The method of FIG. 2 includes selecting (204), by the tagging module (191) based on the contextual information (220), candidate profiles (224) from a plurality of friend profiles (223) associated with a profile (281) of a user (101). Selecting (204) based on the contextual information (220) candidate profiles (224) from a plurality of friend profiles (223) associated with a profile (281) of a user (101) may be carried out by identifying the friend profiles associated with the profile of the user; retrieving personal information corresponding to the identified friend profiles; and cross matching the personal information corresponding to the identified friend profiles with the contextual information. For example, if the contextual information of a photograph indicates that the photograph was taken at a high school alumni reunion, then the tagging module (191) may identify friends that the user went to high school with.

The method of FIG. 2 also optionally includes assigning (205), by the tagging module (191), a rank (226) to each of the selected candidate profiles (224) based on the identified contextual information (220). Assigning (205) a rank (226) to each of the selected candidate profiles (224) based on the identified contextual information (220) may be carried out by assigning rankings based on a particular friend profiles' level of matching with the identified contextual information. Continuing with the alumni reunion example, a first friend profile may have personal information indicating that the user and the first friend went to high school together but the first friend is not listed as an event attendee of the alumni reunion. In this example, the first friend may be assigned a lower ranking than a second friend that was both a high school alumni and an event attendee of the reunion.

The method of FIG. 2 includes suggesting (206), by the tagging module (191) to the user (101), the selected candidate profiles as potential friends to tag in the photograph (192). Suggesting (206) to the user (101) the selected candidate profiles as potential friends to tag in the photograph (192) may be carried out by transmitting one or more messages to the user indicating a representation of the potential friend. Suggesting (206) to the user (101) the selected candidate profiles as potential friends to tag in the photograph (192) may optionally include suggesting (207), by the tagging module (191), the selected candidate profiles (224) based on their assigned rank (226). Suggesting (207) the selected candidate profiles (224) based on their assigned rank (226) may be carried out by displaying the potential friends within a list and sorted in descending order of rank.

Figure 3:
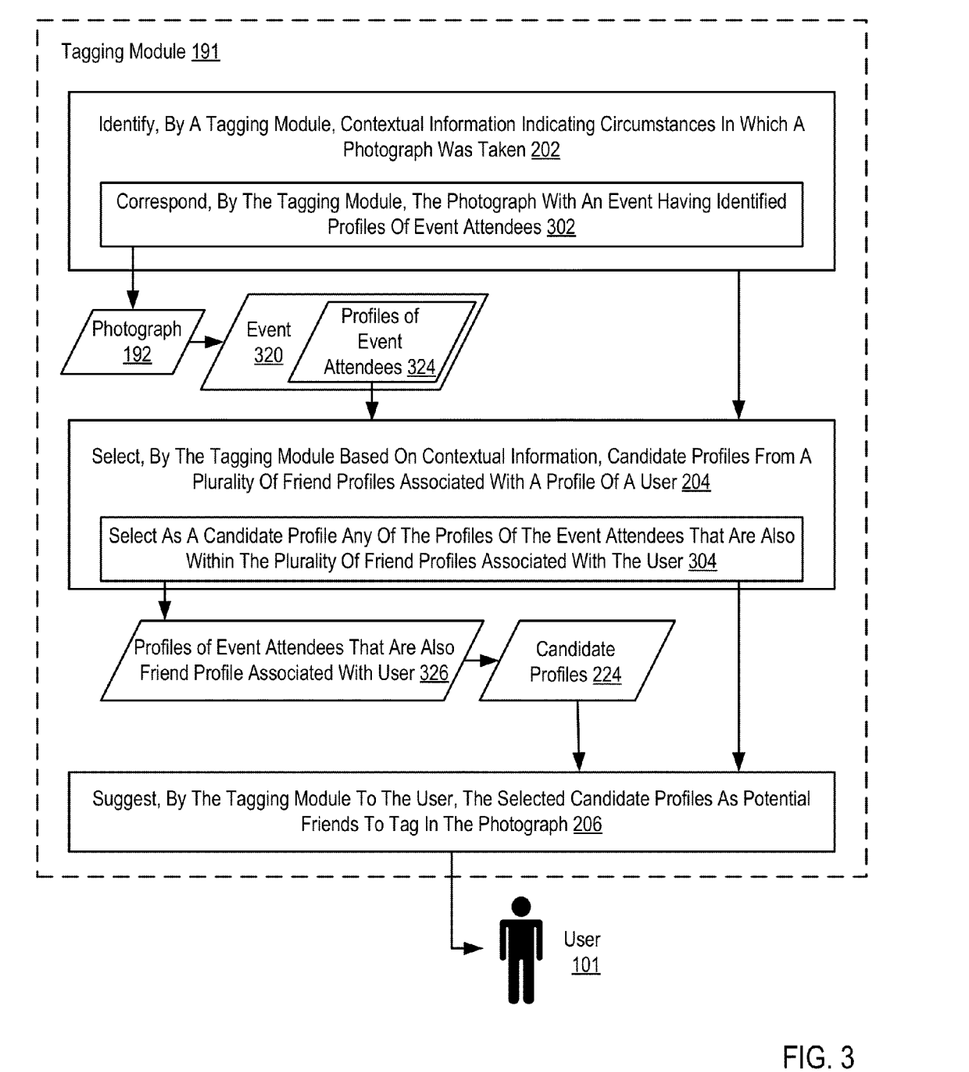
FIG. 3 sets forth a flow chart illustrating a further exemplary method for presenting intelligent tagging suggestions for a photograph according to embodiments of the present invention.

For further explanation, FIG. 3 sets forth a flow chart illustrating a further exemplary method for presenting intelligent tagging suggestions for a photograph according to embodiments of the present invention. The method of FIG. 3 is similar to the method of FIG. 2 in that the method of FIG. 3 also includes: identifying (202), by a tagging module (191), contextual information (220) indicating circumstances in which the photograph (191) was taken; based on the contextual information (220), selecting (204), by the tagging module (191), candidate profiles (224) from a plurality of friend profiles (223) associated with a profile (281) of a user (101); and suggesting (206), by the tagging module (191) to the user (101), the selected candidate profiles as potential friends to tag in the photograph (192).

In the method of FIG. 3, however, identifying (202), by a tagging module (191), contextual information (220) indicating circumstances in which the photograph (191) was taken includes corresponding (302), by the tagging module (191), the photograph (192) with an event (320) having identified profiles (324) of event attendees. Corresponding (302) the photograph (192) with an event (320) having identified profiles (324) of event attendees may be carried out by querying a social networking service for a list of event attendees.

In the method of FIG. 3, selecting (204), by the tagging module (191) based on the contextual information (220), candidate profiles (224) from a plurality of friend profiles (223) associated with a profile (281) of a user (101) includes selecting (304) as a candidate profile (224) any of the profiles (326) of the event attendees that are also within the plurality (223) of friend profiles associated with the user (101). Selecting (304) as a candidate profile (224) any of the profiles (326) of the event attendees that are also within the plurality (223) of friend profiles associated with the user (101) may be carried out by comparing the list of event attendees to the friend profiles of the user.

Figure 4:
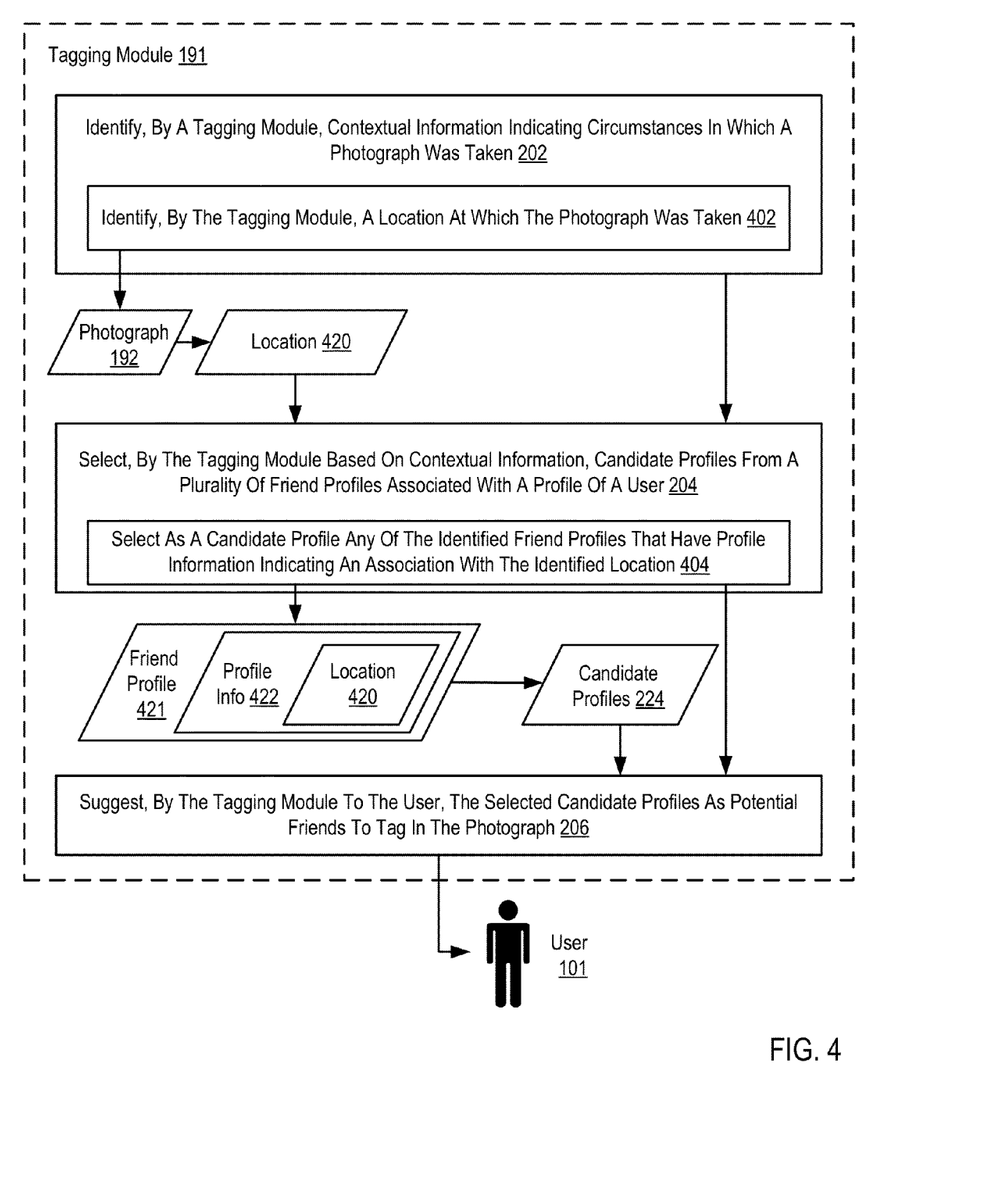
FIG. 4 sets forth a flow chart illustrating a further exemplary method for presenting intelligent tagging suggestions for a photograph according to embodiments of the present invention.

For further explanation, FIG. 4 sets forth a flow chart illustrating a further exemplary method for presenting intelligent tagging suggestions for a photograph according to embodiments of the present invention. The method of FIG. 4 is similar to the method of FIG. 2 in that the method of FIG. 4 also includes: identifying (202), by a tagging module (191), contextual information (220) indicating circumstances in which the photograph (191) was taken; based on the contextual information (220), selecting (204), by the tagging module (191), candidate profiles (224) from a plurality of friend profiles (223) associated with a profile (281) of a user (101); and suggesting (206), by the tagging module (191) to the user (101), the selected candidate profiles as potential friends to tag in the photograph (192).

In the method of FIG. 4, however, identifying (202), by a tagging module (191), contextual information (220) indicating circumstances in which the photograph (191) was taken includes identifying (402), by the tagging module (191), a location (420) at which the photograph (192) was taken. Identifying (402) a location (420) at which the photograph (192) was taken may be carried out by querying a social networking service for tag information corresponding to the photograph or to an album that the photograph is indexed.

In the method of FIG. 4, selecting (204), by the tagging module (191) based on the contextual information (220), candidate profiles (224) from a plurality of friend profiles (223) associated with a profile (281) of a user (101) includes selecting (404) as a candidate profile (224) any of the identified friend profiles (422) that have profile information indicating an association with the identified location (420). Selecting (404) as a candidate profile (224) any of the identified friend profiles (422) that have profile information indicating an association with the identified location (420) may be carried out by searching the friend profiles for information matching the identified location. For example, if the contextual information indicates that the photograph was taken in North Carolina, the tagging module (191) may search the friend profiles for the data entries of North Carolina. In this case, a friend of the user indicating a home town of North Carolina or a recent visit to North Carolina may return a match for contextual information with a North Carolina location.

Figure 5:
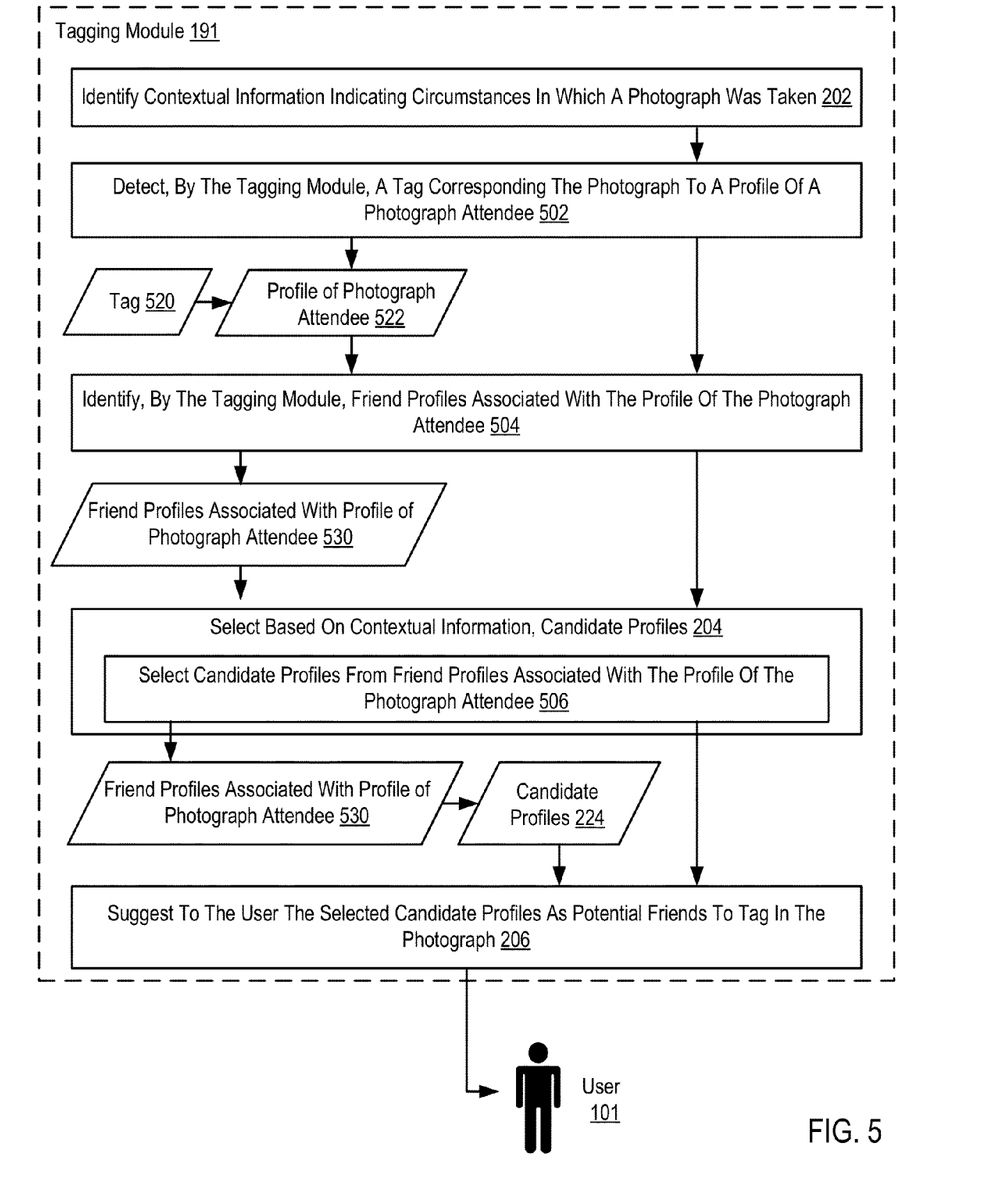
FIG. 5 sets forth a flow chart illustrating a further exemplary method for presenting intelligent tagging suggestions for a photograph according to embodiments of the present invention.

For further explanation, FIG. 5 sets forth a flow chart illustrating a further exemplary method for presenting intelligent tagging suggestions for a photograph according to embodiments of the present invention. The method of FIG. 5 is similar to the method of FIG. 2 in that the method of FIG. 5 also includes: identifying (202), by a tagging module (191), contextual information (220) indicating circumstances in which the photograph (191) was taken; based on the contextual information (220), selecting (204), by the tagging module (191), candidate profiles (224) from a plurality of friend profiles (223) associated with a profile (281) of a user (101); and suggesting (206), by the tagging module (191) to the user (101), the selected candidate profiles as potential friends to tag in the photograph (192).

The method of FIG. 5, however, includes detecting (502), by the tagging module (191), a tag (520) of the photograph (192) that identifies a profile (522) of a photograph attendee. Detecting (502) a tag (520) of the photograph (192) that identifies a profile (522) of a photograph attendee may be carried out by receiving an indication from a social networking service that the photograph contains a tag that corresponds a profile with a photograph attendee.

The method of FIG. 5 also includes identifying (504), by the tagging module (191), friend profiles (530) associated with the profile (522) of the photograph attendee. Identifying (504) friend profiles (530) associated with the profile (522) of the photograph attendee may be carried out by searching the friend profiles for a match with an identified profile of a photograph attendee.

In the method of FIG. 5, selecting (204), by the tagging module (191) based on the contextual information (220), candidate profiles (224) from a plurality of friend profiles (223) associated with a profile (281) of a user (101) includes selecting (506) candidate profiles (224) from the identified friend profiles (530) associated with the profile (522) of the photograph attendee. Selecting (506) candidate profiles (224) from the identified friend profiles (530) associated with the profile (522) of the photograph attendee may be carried out by determining the friend profiles corresponding to the profile of the photograph attendee; and searching the friend profiles of the photograph attendee for matches with the contextual information.

Figure 6:
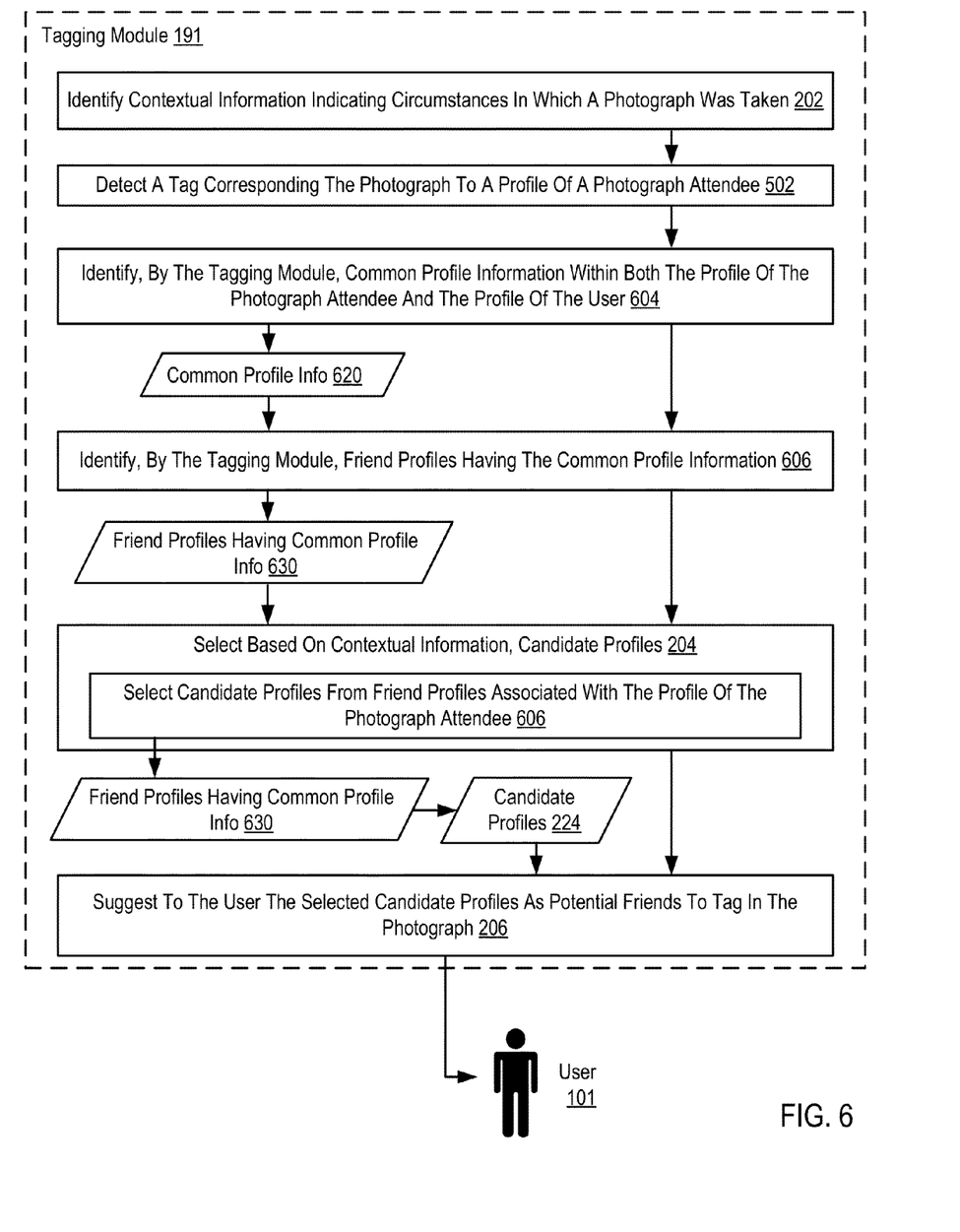
FIG. 6 sets forth a flow chart illustrating a further exemplary method for presenting intelligent tagging suggestions for a photograph according to embodiments of the present invention.

For further explanation, FIG. 6 sets forth a flow chart illustrating a further exemplary method for presenting intelligent tagging suggestions for a photograph according to embodiments of the present invention. The method of FIG. 6 is similar to the method of FIG. 2 in that the method of FIG. 6 also includes: identifying (202), by a tagging module (191), contextual information (220) indicating circumstances in which the photograph (191) was taken; based on the contextual information (220), selecting (204), by the tagging module (191), candidate profiles (224) from a plurality of friend profiles (223) associated with a profile (281) of a user (101); and suggesting (206), by the tagging module (191) to the user (101), the selected candidate profiles as potential friends to tag in the photograph (192). The method of FIG. 6 is also similar to the method of FIG. 5 in that the method of FIG. 6 also includes detecting (502), by the tagging module (191), a tag (520) of the photograph (192) that identifies a profile (522) of a photograph attendee.

The method of FIG. 6 includes identifying (604), by the tagging module (191), common profile information (620) within both the profile (522) of the photograph attendee and the profile (281) of the user (101). Identifying (604), by the tagging module (191), common profile information (620) within both the profile (522) of the photograph attendee and the profile (281) of the user (101) may be carried out by comparing the information within the profile of the user to the information with the profile of the photograph attendee. For example, both the user and the photograph attendee may be associated with a dog club; a current city; a hometown; or attended the same school.

The method of FIG. 6 includes identifying (606), by the tagging module (191), friend profiles (630) having the common profile information (620). Identifying (606) friend profiles (630) having the common profile information (620) may be carried out by searching the friend profiles for the common profile information. For example, if both the photograph attendee and the user attended the same college then the tagging module would search the friend profiles for information indicating one of the friends also attended the same college.

In the method of FIG. 6, selecting (204), by the tagging module (191) based on the contextual information (220), candidate profiles (224) from a plurality of friend profiles (223) associated with a profile (281) of a user (101) includes selecting (606) candidate profiles (224) from the identified friend profiles (630) having the common profile information (620). Selecting (606) candidate profiles (224) from the identified friend profiles (630) having the common profile information (620) may be carried out by storing an indication that a particular profile is a match with the contextual information.

Figure 7A:
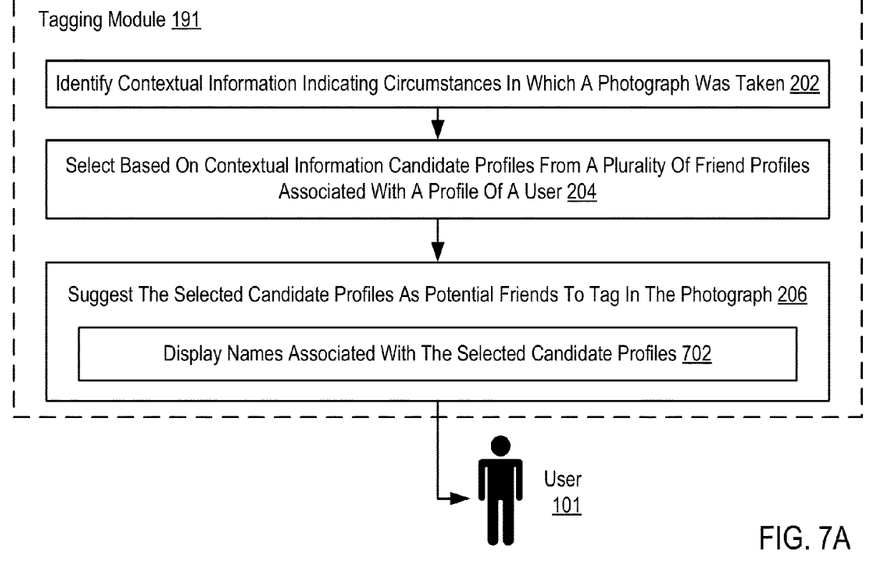
FIG. 7A sets forth a flow chart illustrating a further exemplary method for presenting intelligent tagging suggestions for a photograph according to embodiments of the present invention.
Figure 7B:
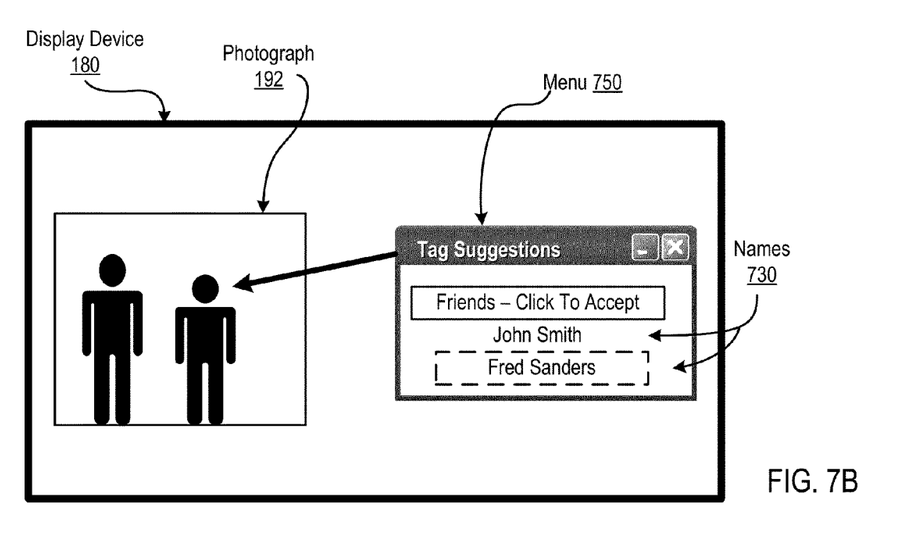
FIG. 7B sets forth a diagram of a display device suggesting to the user selected candidate profiles according to the method of FIG. 7A.

For further explanation, FIG. 7A sets forth a flow chart illustrating a further exemplary method for presenting intelligent tagging suggestions for a photograph according to embodiments of the present invention. FIG. 7B sets forth a diagram of a display device suggesting to the user selected candidate profiles according to the method of FIG. 7A. The method of FIG. 7A is similar to the method of FIG. 2 in that the method of FIG. 7A also includes: identifying (202), by a tagging module (191), contextual information (220) indicating circumstances in which the photograph (191) was taken; based on the contextual information (220), selecting (204), by the tagging module (191), candidate profiles (224) from a plurality of friend profiles (223) associated with a profile (281) of a user (101); and suggesting (206), by the tagging module (191) to the user (101), the selected candidate profiles as potential friends to tag in the photograph (192).

In the method of FIG. 7A, suggesting (206), by the tagging module (191) to the user (101), the selected candidate profiles as potential friends to tag in the photograph (192) includes displaying (702) names (730) associated with the selected candidate profiles. Displaying (702) names associated with the selected candidate profiles may be carried out by displaying a popup message containing a menu listing the selected candidate profiles. For example, FIG. 7B includes the display device (180) of FIG. 1 displaying the photograph (192) along with a popup message with a menu (750) that lists the names (730) of two selected candidate profiles. In the example of FIG. 7B, the user selects one of the names (730) from the menu (750) to tag one of the photograph attendees. In this case, if the user selected "John Smith," a tag would be created associating the profile of "John Smith" with the photograph (192).

Figure 8A:
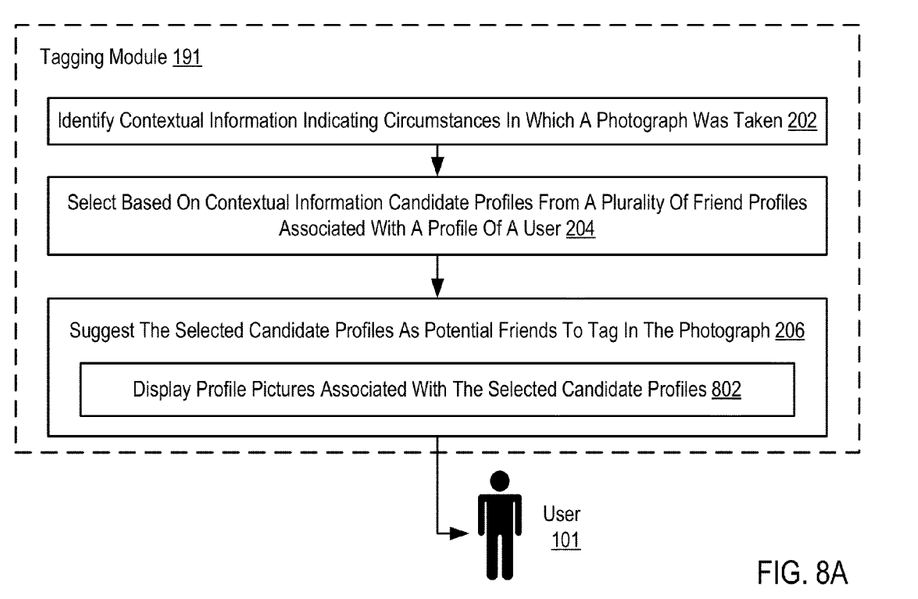
FIG. 8A sets forth a flow chart illustrating a further exemplary method for presenting intelligent tagging suggestions for a photograph according to embodiments of the present invention.
Figure 8B:
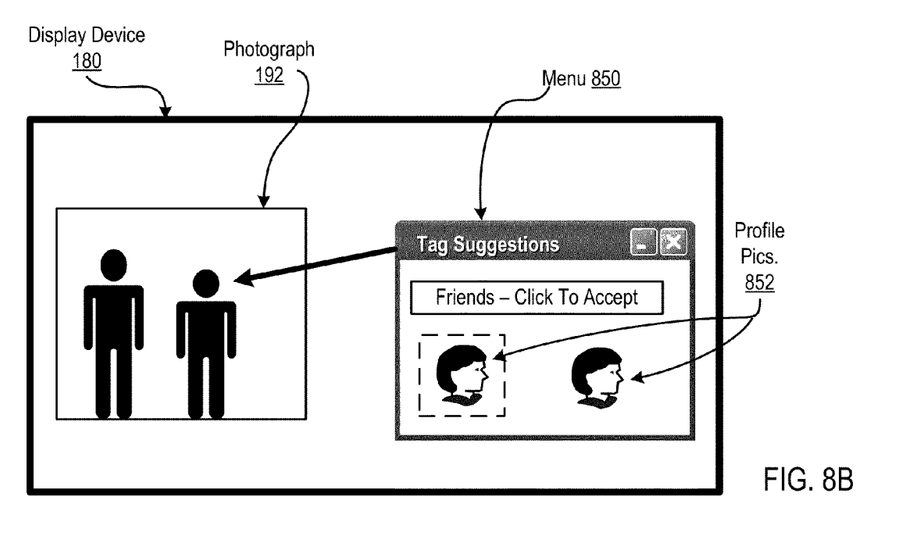
FIG. 8B sets forth a diagram of a display device suggesting to the user selected candidate profiles according to the method of FIG. 8A.

For further explanation, FIG. 8A sets forth a flow chart illustrating a further exemplary method for presenting intelligent tagging suggestions for a photograph according to embodiments of the present invention. FIG. 8B sets forth a diagram of a display device suggesting to the user selected candidate profiles according to the method of FIG. 8A. The method of FIG. 8A is similar to the method of FIG. 2 in that the method of FIG. 8A also includes: identifying (202), by a tagging module (191), contextual information (220) indicating circumstances in which the photograph (191) was taken; based on the contextual information (220), selecting (204), by the tagging module (191), candidate profiles (224) from a plurality of friend profiles (223) associated with a profile (281) of a user (101); and suggesting (206), by the tagging module (191) to the user (101), the selected candidate profiles as potential friends to tag in the photograph (192).

In the method of FIG. 8A, suggesting (206), by the tagging module (191) to the user (101), the selected candidate profiles as potential friends to tag in the photograph (192) includes displaying (802) profile pictures (852) associated with the selected candidate profiles. Displaying (802) profile pictures (852) associated with the selected candidate profiles may be carried out by displaying a popup message containing a menu listing the profile pictures of the selected candidate profiles. For example, FIG. 8B includes the display device (180) of FIG. 1 displaying the photograph (192) along with a popup message with a menu (850) that contains the profile pictures (852) of two selected candidate profiles. In the example of FIG. 8B, the user selects one of the profile pictures (852) from the menu (850) to tag one of the photograph attendees. In this case, if the user selected one of the pictures, a tag would be created associating the profile corresponding to the selected profile picture with the photograph (192).

Exemplary embodiments of the present invention are described largely in the context of a fully functional computer system for presenting intelligent tagging suggestions for a photograph. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for presenting intelligent tagging suggestions for a photograph, the apparatus comprising a computer processor, a computer memory operatively coupled to the computer processor, the computer memory having disposed within it computer program instructions that when executed by the computer processor cause the apparatus to carry out the steps of:

identifying, by a tagging module, contextual information indicating circumstances in which the photograph was taken;

based on the contextual information, selecting, by the tagging module, candidate profiles from a plurality of friend profiles associated with a profile of a user; and suggesting, by the tagging module to the user, the selected candidate profiles as potential friends to tag in the photograph.

2. The apparatus of claim 1 further comprising:

assigning, by the tagging module, a rank to each of the selected candidate profiles based on the identified contextual information; and wherein suggesting the selected candidate profiles includes suggesting, by the tagging module, the selected candidate profiles based on their assigned rank.

3. The apparatus of claim 1 wherein identifying contextual information includes: corresponding, by the tagging module, the photograph with an event having identified profiles of event attendees; and wherein selecting potential candidate profiles includes selecting as a candidate profile any of the profiles of the event attendees that are also within the plurality of friend profiles associated with the user.

4. The apparatus of claim 1 wherein identifying contextual information includes identifying, by the tagging module, a location at which the photograph was taken;

wherein selecting potential candidate profiles includes selecting as a candidate profile any of the identified friend profiles that have profile information indicating an association with the identified location.

5. The apparatus of claim 1 further comprising:

detecting, by the tagging module, a tag of the photograph that identifies a profile of a photograph attendee;

identifying, by the tagging module, friend profiles associated with the profile of the photograph attendee; and wherein selecting candidate profiles includes selecting candidate profiles from the identified friend profiles associated with the profile of the photograph attendee.

6. The apparatus of claim 1 further comprising:
  detecting, by the tagging module, a tag corresponding the photograph to a profile of a photograph attendee;
  identifying, by the tagging module, common profile information within both the profile of the photograph attendee and the profile of the user;
  identifying, by the tagging module, friend profiles having the common profile information; and
  wherein selecting candidate profiles includes selecting candidate profiles from the identified friend profiles having the common profile information.

7. A computer program product for presenting intelligent tagging suggestions for a photograph, the computer program product disposed upon a computer readable storage medium, the computer program product comprising computer program instructions capable, when executed, of causing a computer to carry out the steps of:
  identifying, by a tagging module, contextual information indicating circumstances in which the photograph was taken;
  based on the contextual information, selecting, by the tagging module, candidate profiles from a plurality of friend profiles associated with a profile of a user; and
  suggesting, by the tagging module to the user, the selected candidate profiles as potential friends to tag in the photograph.

8. The computer program product of claim 7 further comprising:
  assigning, by the tagging module, a rank to each of the selected candidate profiles based on the identified contextual information; and
  wherein suggesting the selected candidate profiles includes suggesting, by the tagging module, the selected candidate profiles based on their assigned rank.

9. The computer program product of claim 7 wherein identifying contextual information includes: corresponding, by the tagging module, the photograph with an event having identified profiles of event attendees; and
  wherein selecting potential candidate profiles includes selecting as a candidate profile any of the profiles of the event attendees that are also within the plurality of friend profiles associated with the user.

10. The computer program product of claim 7 wherein identifying contextual information includes identifying, by the tagging module, a location at which the photograph was taken;
  wherein selecting potential candidate profiles includes selecting as a candidate profile any of the identified friend profiles that have profile information indicating an association with the identified location.

11. The computer program product of claim 7 further comprising:
  detecting, by the tagging module, a tag of the photograph that identifies a profile of a photograph attendee;
  identifying, by the tagging module, friend profiles associated with the profile of the photograph attendee; and
  wherein selecting candidate profiles includes selecting candidate profiles from the identified friend profiles associated with the profile of the photograph attendee.

12. The computer program product of claim 7 further comprising:
  detecting, by the tagging module, a tag corresponding the photograph to a profile of a photograph attendee;
  identifying, by the tagging module, common profile information within both the profile of the photograph attendee and the profile of the user;
  identifying, by the tagging module, friend profiles having the common profile information; and
  wherein selecting candidate profiles includes selecting candidate profiles from the identified friend profiles having the common profile information.

\* \* \* \* \*